United States Patent [19]
Yamaguchi et al.

[11] Patent Number: 5,829,732
[45] Date of Patent: Nov. 3, 1998

[54] EXHAUST PIPE SUPPORTING DEVICE

[75] Inventors: Naoki Yamaguchi; Kenji Murase; Motoo Kunihiro, all of Osaka; Takashi Akimoto; Hiroyuki Fujioka, both of Aichi-ken, all of Japan

[73] Assignees: Toyo Tire & Rubber Co., Ltd., Osaka; Toyota Jidosha Kabushiki Kaisha, Aichi-ken, both of Japan

[21] Appl. No.: 819,131

[22] Filed: Mar. 17, 1997

[30] Foreign Application Priority Data

Mar. 27, 1996 [JP] Japan .................................... 8-072346
Jun. 12, 1996 [JP] Japan .................................... 8-151085

[51] Int. Cl.$^6$ ........................................................ F16F 7/00
[52] U.S. Cl. ........................... 248/610; 248/58; 248/634; 267/141
[58] Field of Search ..................... 248/610, 634, 248/638, 58, 74.2; 180/89.2; 267/141

[56] References Cited

U.S. PATENT DOCUMENTS

| | | | |
|---|---|---|---|
| 4,660,797 | 4/1987 | Tönnies | 248/610 |
| 4,746,104 | 5/1988 | Probst | 180/89.2 X |
| 4,817,909 | 4/1989 | Deane | 248/610 |
| 5,050,837 | 9/1991 | Hamada et al. | 248/610 |
| 5,082,252 | 1/1992 | Miyamoto | 248/634 X |
| 5,271,595 | 12/1993 | Simon et al. | 248/610 X |
| 5,398,907 | 3/1995 | Kelchner | 248/610 X |
| 5,507,463 | 4/1996 | Kobylinski et al. | 248/610 |
| 5,673,877 | 10/1997 | Karner et al. | 248/58 |

FOREIGN PATENT DOCUMENTS

| | | |
|---|---|---|
| 3-66953 | 3/1991 | Japan . |
| 4-116039 | 10/1992 | Japan . |
| 7-208158 | 8/1995 | Japan . |

Primary Examiner—Ramon O. Ramirez
Assistant Examiner—Derek J. Berger
Attorney, Agent, or Firm—Jordan & Hamburg

[57] ABSTRACT

An exhaust pipe supporting device includes a generally elliptical body portion integrally formed of an elastic material, such as rubber. The body portion includes a first holder portion having a through-hole to receive a support member associated with a car body, a second holder portion having another through-hole to receive a support member associated with the exhaust pipe. A pair of lateral walls connect the first and second holder portions by attachment at opposite ends to opposed sides of the first and second holding portions. The first and second holding are held in this manner in spaced apart relation to each other, and a central connector is disposed intermediate between the first and second holder portions and connected at opposite sides thereof to the lateral walls. The central connector portion includes a central portion formed as a mass section, which optionally includes a metal mass portion, and opposite lateral portions which extend from the mass section to the opposite sides. The mass section is heavier than the opposite portions, the latter which are bifurcated to provide branch portions advantageously diverging at a branch angle in a range between 30 and 60 degrees.

8 Claims, 9 Drawing Sheets

EXHAUST PIPE SUPPORTING DEVICE

BACKGROUND OF THE INVENTION

The present invention relates to an automobile muffler hanger, i.e., an exhaust pipe supporting device, for supporting an exhaust pipe on a car body in a vibrationproof manner.

Concerning a support device for supporting an exhaust pipe in a vibrationproof manner, there has heretofore been known one, which is integrally formed of an elastic material such as rubber, wherein a first holder portion having wherein a first holder portion having a through-hole to receive a support member associated with the car body, and a second holder portion having a through-hole to receive a support member associated with the exhaust pipe, are connected by right and left lateral walls in vertically spaced opposed relation to each other, the assembly being approximately annular as a whole.

In this support device, which absorbs vibrations by the elastic material, the right and left lateral walls tend to swing owing to the vibrations from the car body or exhaust pipe. In a high frequency range (e.g., a range of 500 Hz and above), the dynamic absolute spring constant increases, making it impossible to expect sufficient effect of suppressing vibration transmission.

Thus, to improve the effect of suppressing vibration transmission in the high frequency range of 500 Hz and above, it has been suggested to dispose the central connector portion between the first and second holder portions so as to integrate the right and left lateral walls (for example, JP-A-03066953). Further, it has also been suggested that as shown in FIG. 16, the opposite lateral portions 105b of a central connector portion 105 between first and second holder portions 101, 102 respectively having through-holes 111, 112 be bifurcated at an angle of about 90° and connected to the right and left lateral walls 103.

However, in the case of this support device, since the right and left lateral walls are connected together by the central connector portion, although the rigidity in the transverse direction increases to make it hard for rolling to occur, thus enlarging the frequency range in which the vibration transmitting power is low, there occurs a problem that a sufficient vibration transmission suppressing effect cannot be obtained in and around a range of 300–400 Hz.

An investigation of this problem shows that the frequency characteristic of the dynamic absolute spring constant of this type of support device is determined by the mass distribution and the Young's modulus of the elastic material which is the raw material. When Young's modulus increases, the resonance characteristic is shifted to the higher frequency side but as the Young's modulus decreases, the resonance characteristic is shifted to the lower frequency side.

On the other hand, the exhaust pipe of an automobile is liable to be heated to a considerably high temperature by exhaust gases, and concerning the support device which supports it, the atmosphere temperature rises to about 100° C. If the atmosphere temperature rises as described, this results in the elastic material, such as rubber, being softened and its Young's modulus lowers and so does the transverse rigidity. Therefore, the frequency characteristic is shifted to the lower frequency side. As a result, the dynamic absolute spring constant increases in and around the frequency range of 300–400 Hz, so that a sufficient vibration transmission suppressing effect cannot be obtained in this frequency range and a noise offensive to the ear is produced.

That is, in said support device, the band of the dynamic absolute spring constant effective for suppression of vibration transmission is narrowed or the value of the dynamic absolute spring constant is increased, and the band shift due to a temperature change is also increased; thus, the support device does not act effectively to suppress the transmission of vibrations of the exhaust pipe of the automobile. Particularly, the effect of suppressing vibration transmission is low in and around the band of 300–400 Hz.

SUMMARY OF THE INVENTION

An object of the invention is to provide an exhaust pipe supporting device wherein the central connector portion in the aforesaid type of support device is improved, thereby preventing the frequency characteristic from being shifted owing to an increase in the atmosphere temperature, retaining the frequency characteristic, which is stable against temperature changes ranging from ordinary temperature to about 100° C., lowering the dynamic absolute spring constant in a frequency range of 300–400 Hz, and enabling a satisfactory stable vibration transmission suppressing effect to be exerted.

Further, another object of the invention is to provide an exhaust pipe supporting device which uses a metal mass body of high specific gravity in a mass section set in the central portion of a central connector portion, whereby a satisfactory vibration transmission suppressing effect can be exerted particularly over a wide frequency range of 200–400 Hz.

An exhaust pipe supporting device according to the present invention which is capable of solving said problem, being integrally formed of an elastic material such as rubber, includes a first holder portion having a through-hole to receive a support member associated with the car body, a second holder portion having a through-hole to receive a support member associated with the exhaust pipe, a pair of lateral walls which connect the first and second holder portions in spaced relation to each other on opposite sides, and a central connector portion disposed intermediate between the first and second holder portions and connected to the opposite walls. The support device is characterized in that the central connector portion is formed as a mass section in its central portion which is heavier than the opposite lateral portions, the opposite lateral portions which extend from said mass section to the opposite sides being bifurcated to provide branch portions, the branch portions being connected to the lateral walls.

According to this support device, the central connector portion has its transverse rigidity suitably increased by a pulling and compressing action on the central portion, and the frequency range effective for suppressing vibration transmission, i.e., the frequency range in which the dynamic absolute spring constant is reduced, is widened.

Particularly, even if the atmosphere temperature around the support device increases, since the central portion of the central connector portion is formed as a mass section and since the opposite lateral portions are made in a bifurcated branch form and connected to the lateral walls, the bifurcated branch portions are stretched as the right and left lateral walls are stretched under the weight of the exhaust pipe, so that the Young's modulus of the branch portions is increased, by nature of to which increase, coupled with the particular mass distribution resulting from the central portion being formed as the mass section, vibrations are effectively damped by the resonance of said central portion and an action is produced which tends to shift the resonance characteristic to the higher frequency side. This means that the resonance characteristic can be prevented from shifting to the lower frequency side as temperature rises.

Therefore, it is possible to retain the frequency characteristic which is stable against temperature changes ranging from ordinary temperature to 100° C. and to reduce the dynamic absolute spring constant at 300–400 Hz, particularly in the vicinity of 400 Hz; thus, a satisfactory vibration transmission suppressing effect can be exerted.

The second form of the present invention is an exhaust pipe supporting device of the same type as above, characterized in that the central portion of the central connector portion is formed as a mass section in the form of a metal mass body, the opposite lateral portions which extend from said mass section to the opposite sides being bifurcated to provide branch portions, the branch portions being connected to the lateral walls.

In this case, since a greater amount of mass is retained with the same volume than in the case of using an ordinary elastic material alone which is rubber or the like, the characteristics, such as the dynamic absolute spring constant, can be greatly improved, so that vibration damping due to resonance becomes more effective to the extent that in a wide frequency range ranging from 200 Hz to 400 Hz, the dynamic absolute spring constant can be kept low, allowing a satisfactory vibration transmission suppressing effect to be exerted.

Particularly, in the support device in each form of the present invention described above, if the branch angle α of the branch portions of the central connector portion is set at 30°–60° and the ratio (T/L) of the thickness T to the length L of the branch portions is set at 0.2–0.5, then the dynamic absolute spring constant reducing effect in the frequency range and the vibration transmission suppressing effect are made more effective.

That is, if the branch angle is less than said angle, the transverse rigidity becomes too high, while if it is greater than said angle, the transverse rigidity becomes too low. Further, if the ratio of the thickness to the length of the branch portions is less than in said range, the resonance frequency due to the mass section of the central connector portion is decreased, while if it is greater than in said range, the resonance frequency due to the mass section of the central connector portion is increased, so that a sufficient vibration transmission suppressing effect in the frequency range of 300–400 Hz cannot be obtained.

Further, in the support device, it is preferable that the front-rear length dimension F of the mass section be set at 0.7–5.0 times the front-rear thickness dimension of the main body. Thereby, any desired amount of mass suitable for an intended object can be provided within said range, facilitating engineering design. Moreover, the frequency range in which the dynamic absolute spring constant can be reduced is further widened.

Further, the metal mass body is preferably inseparably connected to the elastic material of the central connector portion by adhesive or embedding means. That is, the metal mass body can be integrally held so firmly in the central connector portion that there is no danger of the metal mass body coming off owing to vibrations.

DETAILED DESCRIPTION OF THE INVENTION

Embodiments of the exhaust pipe supporting device of the invention will now be described.

Figure 1:
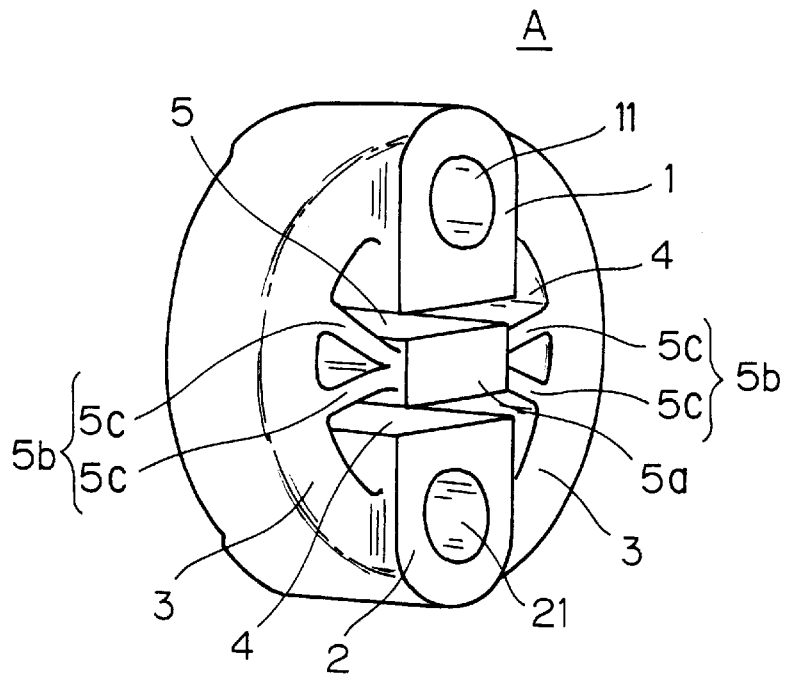
FIG. 1 is a perspective view showing an exhaust pipe supporting device according to a first embodiment of the present invention.
Figure 2:
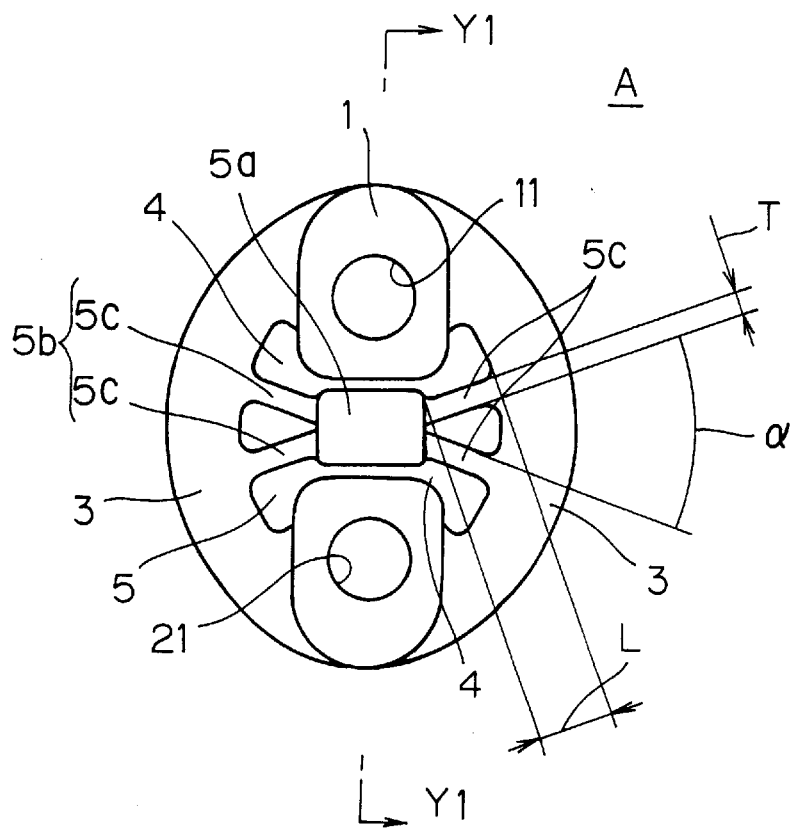
FIG. 2 is a front view of said support device.
Figure 3:
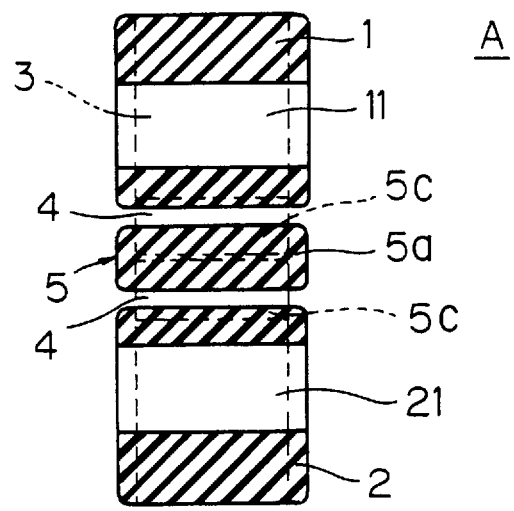
FIG. 3 is a sectional view taken along he line Y1—Y1 the preceding figure.

FIGS. 1–3 show an exhaust pipe supporting device according to a first embodiment of the invention.

A support device (A) in this embodiment, as shown, is in the form of a substantially elliptic, thickplate, made by the integral vulcanization molding of an elastic material, which is a raw material, i.e. a rubber material, and is constructed as follows.

The upper region of the support device (A) is formed with a first holder portion 1 having a thicknesswise extending through-hole 11 for receiving a support member associated with the car body, and in a lower position spaced a predetermined distance (usually about 10 mm) from the first holder 1 portion, there is formed a second holder portion 2 having a thicknesswise extending through-hole 21 for receiving a support member associated with the exhaust pipe.

The first and second holder portions 1 and 2 are connected together by a pair of archlike lateral walls 3 having their opposite ends connected to the opposite sides of said holder portions; thus, as a whole, it is formed as a vertically symmetrical, substantially elliptic annular body.

The lateral walls 3 are disposed to define gaps 4 between the holder portions 1 and 2 in the intermediate position between the first and second holder portions 1 and 2 and are connected together by a central connector portion 5 connected at its opposite ends to the inner surfaces of the lateral walls 3.

The central connector portion 5 has its central portion formed as a columnar mass section 5a having a greater amount of mass than its opposite lateral portions, and opposite lateral portions 5b extending from the mass section 5a are each bifurcated to form branch portions 5c connected to said lateral walls 3.

In this first embodiment, the mass section 5a has its thicknesswise (front-rear) dimension made greater than the lateral wall 3 and the opposite lateral portions and has its vertical dimension increased to enlarge its form into a quadrangular prism, thereby possessing a greater amount of mass than the opposite lateral portions 5b.

Figure 4:
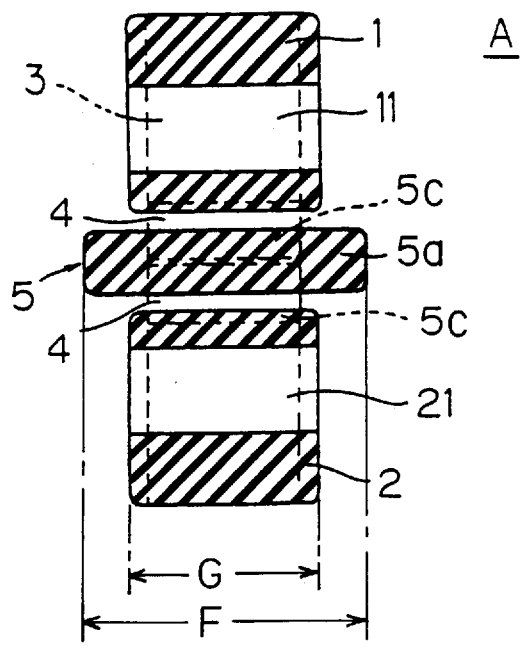
FIG. 4 is a sectional view of a support device according to another embodiment.

Concerning the mass section 5a, it maybe formed to extend front-rear directionally beyond the greatest front-rear thickness of the main body excluding the mass section, that is, the front-rear thickness of the first and second holder portions 1 and 2, so as to have substantial mass (see FIG. 4). In this case, it is preferable from the standpoint stability that the front-rear lengthwise dimension (F) of the mass section 5a do not exceed 5 times the front-rear thickness (G) of the first and second holder portions 1 and 2. In particular, said front-rear lengthwise dimension F is preferably set in the range of 0.7–5.0 times of said thickness G. Thereby, an amount of mass which is suitable for the intended object can be obtained and the frequency range in which the dynamic absolute spring constant can be reduced is widened. Besides this, the mass section 5a may be formed circular or elliptic in cross section to have a greater amount of mass than that of the opposite lateral portions.

Further, the gaps 4 between the central connector portion 5 and the holder portions 1, 2 have their size determined such that when a vibration of great amplitude occurs, the mass section 5a abuts against the inner surfaces of the holder portions 1 and 2 to serve as a stop to prevent excessive deformation.

Concerning the branch configuration of the opposite lateral portions 5b, the branch portions 5c, usually bifurcated, extending from the opposite lateral portions 5b are each fabricated in a thin plate form so that the sum of the thicknesses of the two branch portions may not be greater than the vertical thickness of the mass section 5a; however, it is desirable that the branch angle (open angle) α thereof be 30°–60° and that the length/breadth ratio, i.e., the ratio (T/L) of thickness (T) to length (L) be within the range of 0.2–0.5.

The relation between the branch angle α and the frequency characteristics was investigated, the results being shown below in Table 1. In addition, for the assessment of the characteristics, the dynamic absolute spring constant (K) at 400 Hz was measured with the thickness/length ratio (T/L) of the branch portions 5c set at 0.3, and the assessment was made as follows.

K value<60 N/mm→○
K value60–80 N/mm→Δ
K value>80 N/mm→X

TABLE 1

| Branch angle | 0° | 10° | 20° | 30° | 40° | 50° | 60° | 70° | 80° | 90° |
|---|---|---|---|---|---|---|---|---|---|---|
| Assessed characteristics | X | X | Δ | ○ | ○ | ○ | ○ | Δ | X | X |

It has been found from the above results that it is particularly effective for the branch angle α to be within the range of 30°–60° in reducing the absolute spring constant.

Further, the relation between the thickness/length ratio (T/L) and the frequency was investigated, the results being shown below in Table 2. In addition, for the assessment of the characteristics, the dynamic absolute spring constant (K) at 400 Hz was measured with the branch angle a set at 40° and the assessment made as follows.

K value<60 N/mm→○
K value60–80 N/mm→Δ
K value>80 N/mm→X

TABLE 2

| No. | Branch portions Length | Thickness | Thickness/ Length | Assessed characteristics |
|---|---|---|---|---|
| 1 | 10 | 6 | 0.6 | X |
| 2 | 10 | 5 | 0.5 | ○ |
| 3 | 10 | 4 | 0.4 | ○ |
| 4 | 10 | 3 | 0.3 | ○ |
| 5 | 10 | 2 | 0.2 | ○ |
| 6 | 10 | 1 | 0.1 | X |

It has been found from the above results that a dynamic absolute spring constant reducing effect not be obtained if the thickness/length ratio the branch portions less or greater than in the range of 0.2–0.5.

Therefore, it is desirable in practice that the branch angle (α) and the thickness/length ratio of branch portions 5c be set within said respective ranges.

Figure 5:
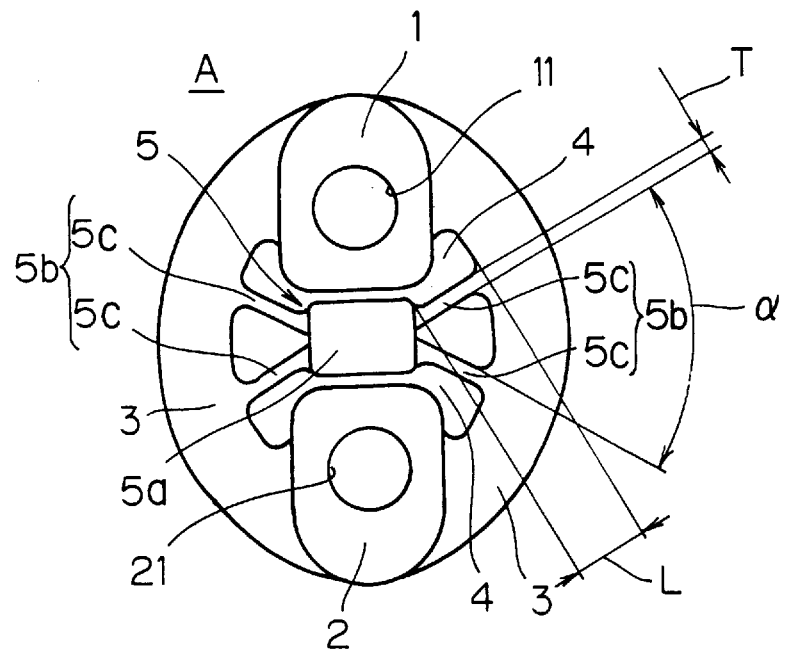
FIG. 5 is a front view showing a support device according to still another embodiment.
Figure 6:
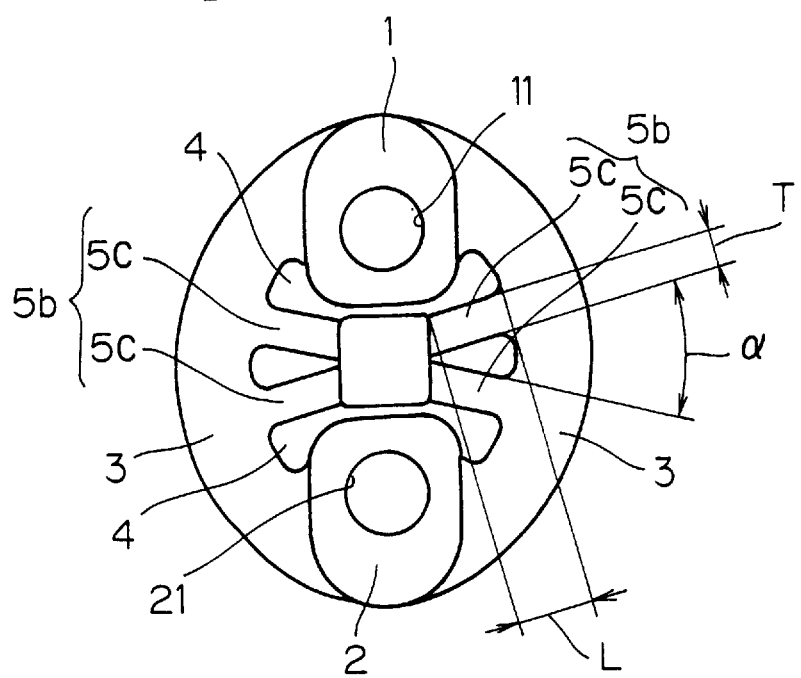
FIG. 6 is a front view showing a support device according to still another embodiment.

FIGS. 5 and 6 show examples in which the branch angle (α) and the thickness/length ratio of the branch portions 5c of said central connector portion 5 are changed, each being set within said range.

FIGS. 7–10 show an embodiment in which a metal mass body 6 is used in the mass section 5a in the central portion of the central connector portion 5. The support device in this embodiment is the same in the basic arrangement as in the first embodiment, and like reference characters are applied to like components and a description thereof is omitted.

In the support device (A) of this embodiment, the central connector portion 5 has its central portion formed as a mass section 5a having a metal mass body 6 of relatively high specific gravity, such as iron or zinc, and the branch portions 5c of the opposite lateral portions 5b extending from the opposite sides of the mass section 5a are connected to the opposite lateral walls 3.

Said metal mass body 6 may be adhesively fixed to the rubber material of the opposite lateral portions 5b of the central connector portion 5. In this case, although the opposite surfaces of the metal mass body 6 may be bonded to the opposite lateral portions 5b, it is desirable from the standpoint of strength to integrally bond them, with the metal mass body 6 embraced with rubber material, as shown in FIGS. 7–10 and FIG. 11. The numeral 7 denotes an adhesive layer. Further, it is also possible to integrally bond the metal body 6 to the rubber material on a post-attaching basis.

Figure 12A:
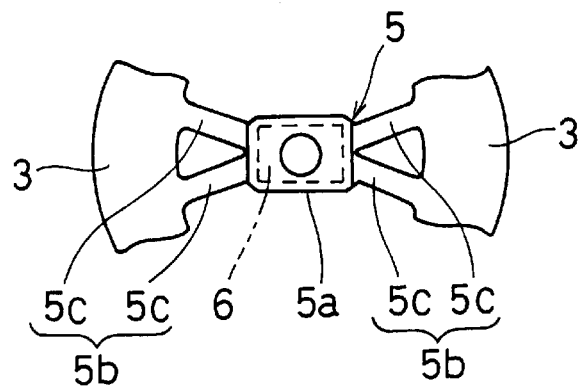
FIG. 12A and 12B are a partial front view and a sectional view, respectively, showing part of a support device according to still another embodiment using a metal mass body.
Figure 12B:
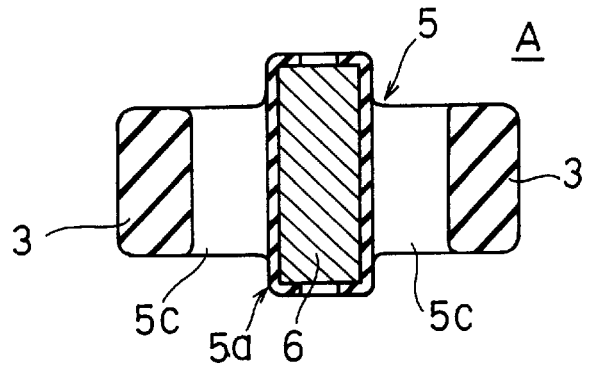

Further, as the means for fixing the metal mass body 6 to the central portion of the central connector portion 5, as shown in FIG. 12, it is possible to unextractably embed it in said rubber material at the same time as the vulcanization molding of rubber material. In this case, it may be embedded such that to support said metal mass body 6 within the vulcanization mold, portions of the metal mass body 6, e.g., central portions of the longitudinal ends, as shown, are left exposed, with the outer edge thereof embraced with rubber material to put the metal mass body in an axially locked state.

Figure 13B:
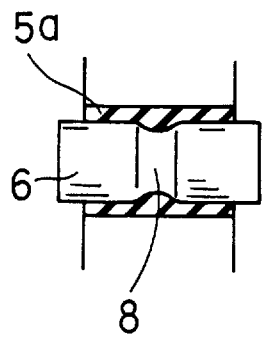
FIGS. 13A and 13B are a partial front view and a sectional view, respectively, showing part of a support device according to still another embodiment using a metal mass body.
Figure 13A:
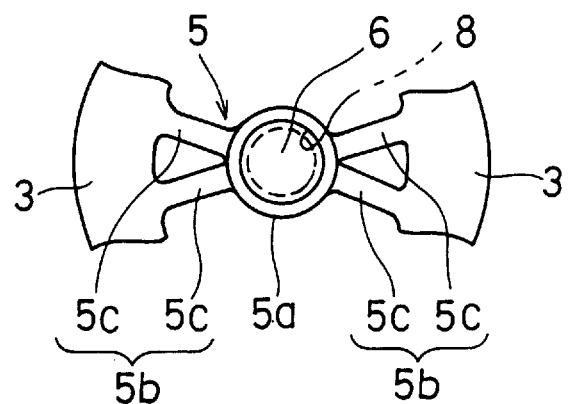
Figure 14A:
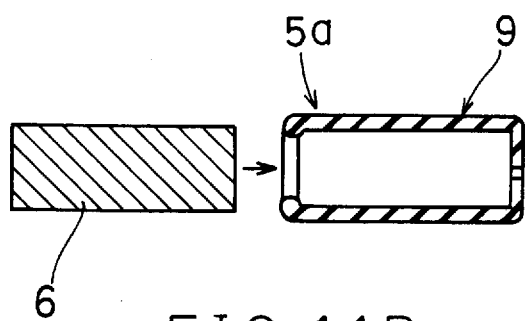
FIGS. 14A and 14B are sectional views of part of a support device according to still another embodiment using a metal mass body, showing the states before and after the metal mass body is attached.
Figure 14B:
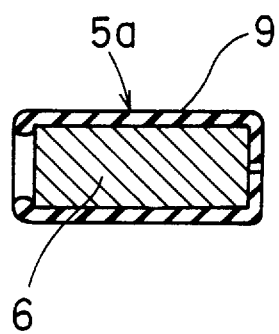

Further, as shown in FIG. 13, the metal mass body 6 may be formed in part with a recess 8 or a ridge and then unextractably held in position by embracing its outer periphery by the vulcanization molding of rubber material. Further, as shown in FIG. 14, in the central portion of the central connector portion 5, a sleeve portion 9 may be formed by the vulcanization molding of rubber material and then a metal mass body 6 which is somewhat greater in diameter than the sleeve portion 9 may be elastically pressed thereinto so that it may not easily come off. In each case, adhesive means may be additionally used in combination therewith.

Further, the metal mass body 6 may be made in sleeve form and the central portion continuing with the branch portions on the opposite sides 5c may be formed by the vulcanization molding of rubber material inserted through the hollow space of the sleeve-like metal mass body 6, whereby the metal mass body 6 is integrally fixed to the central connector portion 5.

Besides this, the invention can be embodied using various fixing means by which the metal mass body 6 can be inseparably fixed to the central portion of the central connector portion 5. Further, the cross sectional shape of the metal mass body 6 may, besides being of a quadrangular prism, be of a circular or elliptic prism as shown in FIG. 13.

At any rate, the use of the metal mass body 6, as compared with the use of rubber material, provides a great amount of mass for its volume, increasing the vibration damping effect due to resonance.

In the mass section 5a of this metal mass body 6, as in the case of the first embodiment, the greater the front-rear dimension F, the greater the amount of mass it has (for example, FIG. 11); however, if the dimension is increased too much, the metal mass body 6 becomes unstable. Therefore, said dimension F is preferably within the range of 0.7–5.0 times the front-rear thickness G of the first and second holder portions 1, 2, whereby an amount of mass corresponding to the object can be provided.

Further, in this embodiment also, as regards the branch shape of said opposite lateral portions 5b, it is desirable as in the first embodiment described above that the branch angle a of the branch portions 5c be within the range of 300°–60° and that the length/breadth ratio, i.e., the ratio (T/L) of the thickness (T) to the length (L) be within the range of 0.2–0.5.

The support device A in the first embodiment constructed in the manner described above, or in an embodiment using the metal mass body 6, is used to support an exhaust pipe by inserting a support member associated with the car body into the through-hole 11 in the upper, first holder portion 1 and fixing it therein and then inserting a support member associated with the exhaust pipe into the through-hole 21 in the lower, second holder portion 2 and fixing it therein.

In this state of use, vibrations transmitted from the exhaust pipe and the car body during the engine operation are absorbed, whereby aggravation of noise vibration in the car interior is prevented. In the case of the present invention, the provision of the central connector portion 5 which connects the lateral walls 3 between the first and second holder portions 1 and 2 provides high transverse rigidity and suppresses rolling.

Particularly, the central connector portion 5 has its central portion formed as the mass section 5a and its opposite lateral portions 5b bifurcated and connected to the opposite lateral walls 3; therefore, the rigidity in the oblique direction is high. Further, as the opposite lateral walls 3 are stretched under the weight of the exhaust pipe, the bifurcated branch portions 5c are also stretched, resulting in an increase in the elastic modulus of the branch portions 5c, be virtue of which increase, coupled with the particular mass distribution resulting from the fact that the central portion has a large amount of mass due to the mass section 5a of rubber material or the mass section 5a having the metal mass body 6, vibrations can be effectively damped by the resonance of the central connector portion 5 and there is produced an action which tends to shift the resonance characteristic to the higher frequency side.

Thus, even if the atmosphere temperature rises to a high temperature of about 100° C. and the elastic material is softened to decrease its Young's modulus, said type of action of the central connector portion 5 prevents the resonance characteristic from being shifted to the lower frequency side. Therefore, irrespective of temperature changes, it is possible to retain a stabilized frequency characteristic, a satisfactory vibration transmission suppressing effect and a noise preventing effect. Particularly in the case where the mass section is formed by the metal mass body, a greater amount of mass can be obtained for the same volume and hence the characteristics including said dynamic absolute spring constant can be greatly improved and a more effective resonance is obtained.

Figure 7:
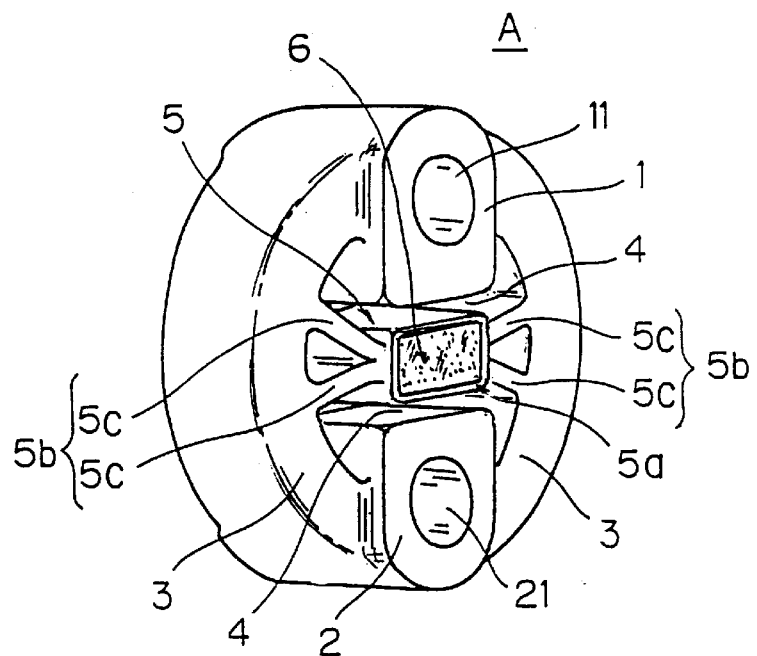
FIG. 7 is a perspective view showing an exhaust pipe supporting device according to an embodiment using a metal mass body.
Figure 8:
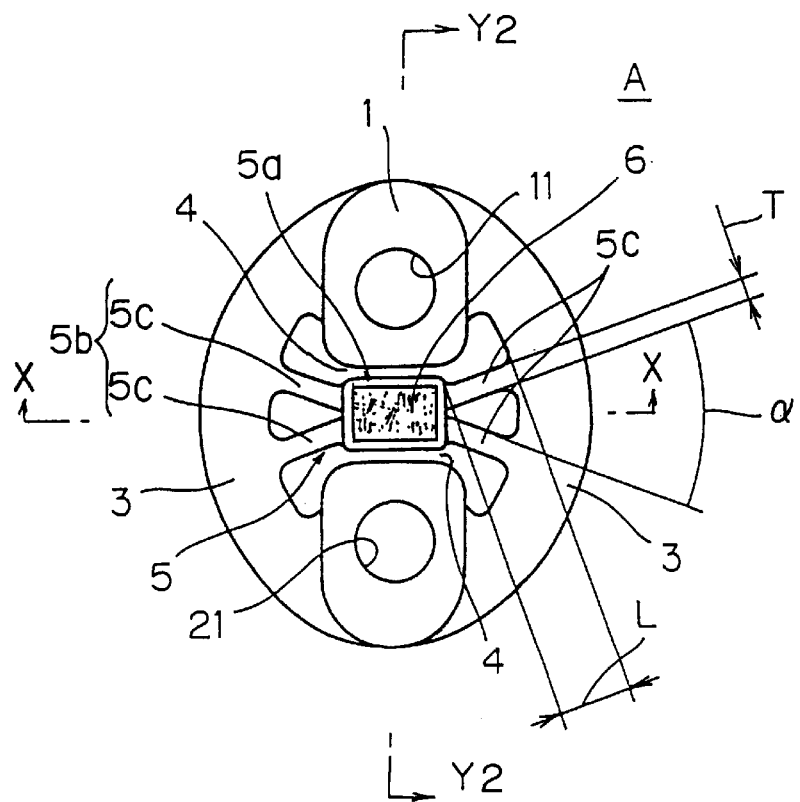
FIG. 8 is a front view of the aforesaid support device.
Figure 9:
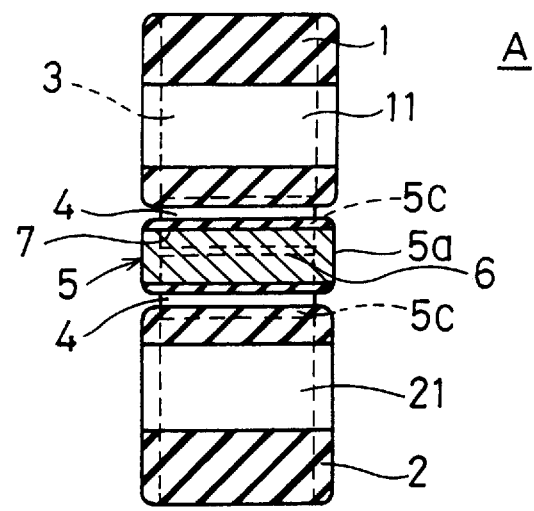
FIG. 9 is a sectional view taken along the line Y2–Y2 in the preceding figure.
Figure 10:
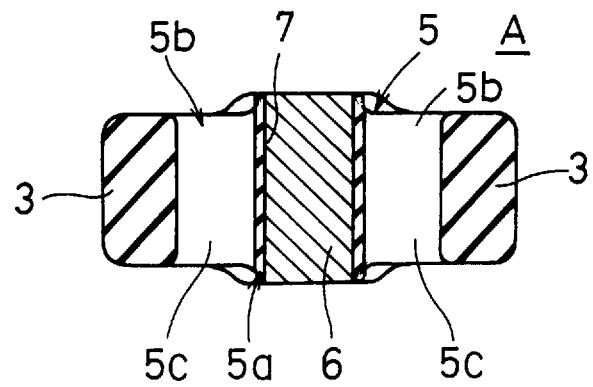
FIG. 10 is a sectional view taken along the line X—X in FIG. 8.
Figure 11:
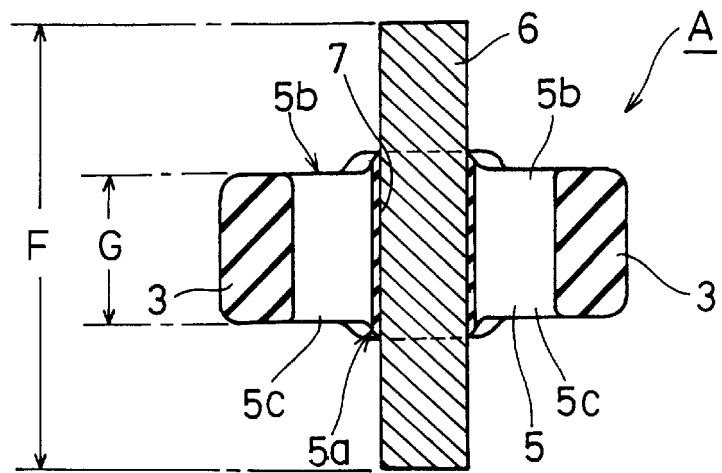
FIG. 11 is a sectional view of a support device according to another embodiment using a metal mass body.
Figure 15:
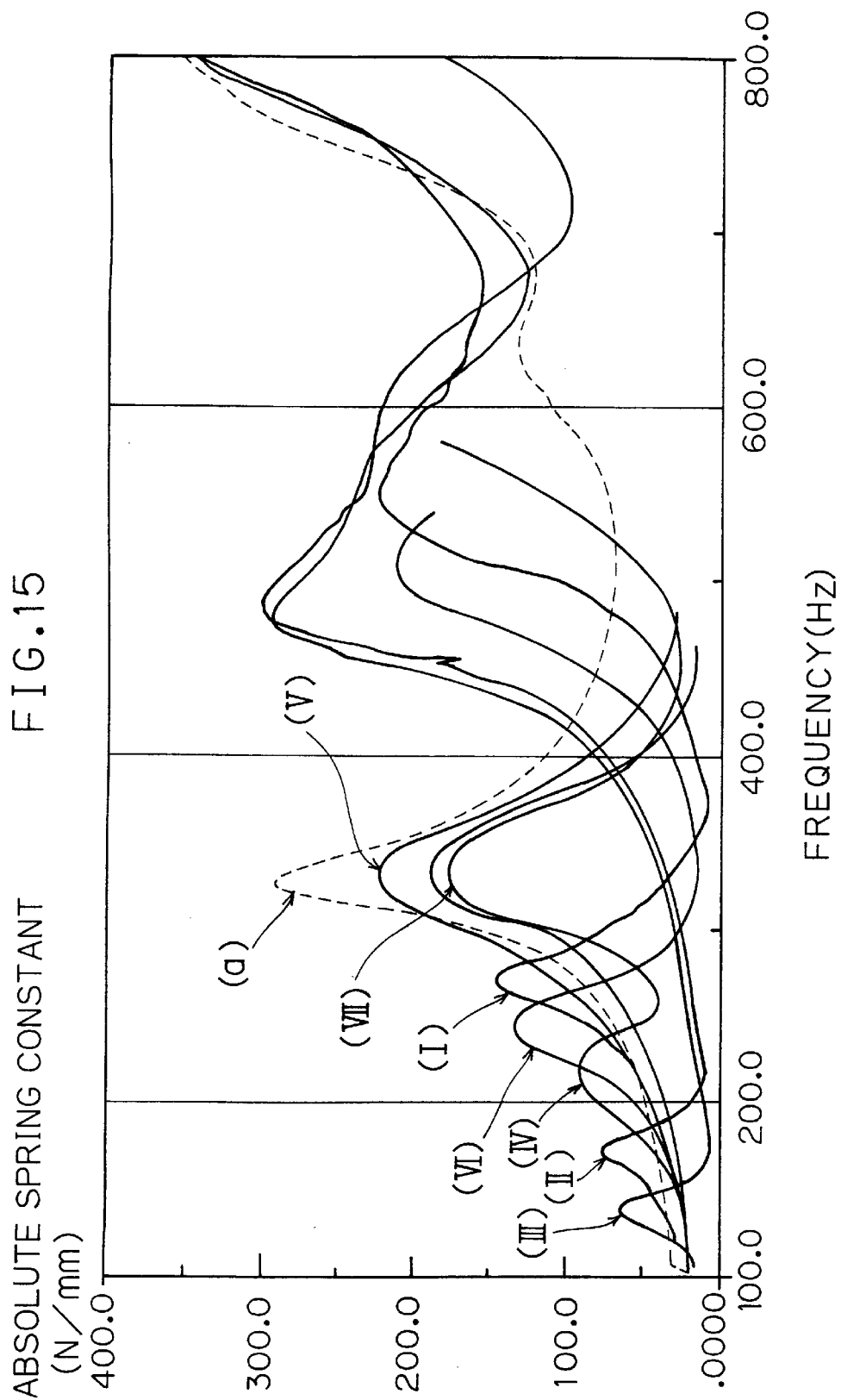
FIG. 15 is a graph showing the relation between frequency and dynamic absolute spring constant.
Figure 16:
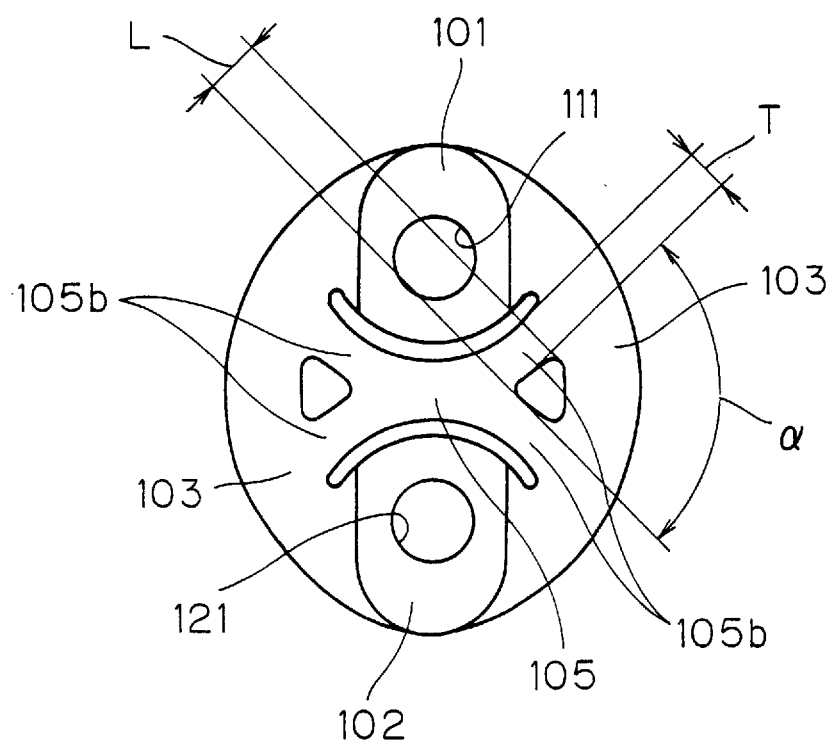
FIG. 16 is a front view showing by way of example a conventional support device.

To confirm the effects of the support device of the present invention, examples I, and IV–VII of the first embodiment shown in FIG. 1 and examples II and III of the embodiment using the metal mass body shown in FIG. 7 were compared with the comparison example (A) of the conventional construction shown in FIG. 16 by measuring the relation between the frequency and the dynamic absolute spring constant. The results are shown in FIG. 15.

In addition, the examples and the comparison example are of the same material, size and construction except for the form of the central connector portion, 5, 105.

And the branch angle a of the examples I–III is 40°, and the ratio (T/L) of their thickness to length is about 0.3, while the branch angle α of the comparison example (a) is 90° and the ratio (T/L) of its thickness to length is about 0.8. Further, the weight of the metal mass body of the example II is 10 g, and the weight of the metal mass body of the example III is 20 g.

The examples IV–VII each have a mass section formed solely of rubber material in the center of the central connector portion as in the case of the example I, and the dynamic absolute spring constant is shown concerning the example IV in which the branch angle α of the branch portions is less than 30°, the example V in which it is greater than 60°, the example VI in which the ratio (T/L) of thickness to length is less than 0.2, and the example VII in which it is greater than 0.5.

As a result of the above, in the comparison example (a), the dynamic absolute spring constant is high in the frequency range of 300–400 Hz, particularly about 350 Hz, and a sufficient vibration transmission suppressing effect has not been obtained in this frequency range.

In contrast, in the case of the example I, the dynamic absolute spring constant can be greatly reduced in the frequency range of 300–400 Hz, particularly about 400 Hz, as compared with the conventional article, and irrespective of temperature changes, a stabilized vibration transmission suppressing effect is obtained since the dynamic absolute spring constant itself is low.

Further, in the case of the example I, the dynamic absolute spring constant somewhat increases in the vicinity of 200–300 Hz, whereas in the examples II and III using the metal mass body, the dynamic absolute spring constant can be greatly reduced in a wide frequency range of 200–400 Hz, as compared with the conventional article, and irrespective of temperature changes, a stabilized vibration transmission suppressing effect is obtained since the dynamic absolute spring constant itself is low.

In addition, it has been confirmed from the examples IV–VII that the branch angle and the thickness/length ratio influence the vibration transmission suppressing effect in the frequency range of 300–400 Hz, and it has been confirmed that it is most effective to set the branch angle within the range of 30°–60° and the thickness/length ratio within the range of 0.2–0.5, as in the example 1–3.

What is claimed is:

1. An exhaust pipe supporting device, comprising:

a body portion integrally formed of an elastic material, said body portion including a first holder portion having a through-hole to receive a support member associated with a car body, a second holder portion having another through-hole to receive a support member associated with the exhaust pipe, a pair of lateral walls which connect said first and second holder portions, opposite ends of said lateral walls being connected to opposite sides of said first and second holding portions, said first and second holding portions being in spaced apart relation to each other, and a central connector portion disposed intermediate between said first and second holder portions and connected at opposite sides thereof to said lateral walls;

said central connector portion includes a central portion formed as a mass section and opposite lateral portions which extend from said mass section to said opposite sides, said mass section being heavier than said opposite lateral portions, said opposite lateral portions being bifurcated to provide branch portions, said branch portions being connected to said lateral walls; and a branch angle α at which said branch portions diverge from said mass section is set within a range of about 30° to about 60° and a ratio T/L of their thickness to length is set within a range of about 0.2 to about 0.5.

2. An exhaust pipe supporting device as set forth in claim 1 wherein said mass section is greater in thickness than said branch portions.

3. An exhaust pipe supporting device as set forth in claim 1 wherein said mass section extends in a direction of a thickness of said body portion beyond a remainder of said body portion.

4. An exhaust pipe supporting device, comprising:

a body portion integrally formed of an elastic material, said body portion including a first holder portion having a through-hole to receive a support member associated with a car body, a second holder portion having another through-hole to receive a support member associated with the exhaust pipe, a pair of lateral walls which connect said first and second holder portions, opposite ends of said lateral walls being connected to opposite sides of said first and second holding portions, said first and second holding portions being in spaced apart relation to each other, and a central connector portion disposed intermediate between said first and second holder portions and connected at opposite sides thereof to said lateral walls;

said central connector portion includes a central portion formed as a mass section including a metal mass portion and opposite lateral portions which extend from said mass section to said opposite sides, said mass section being heavier than said opposite lateral portions, said opposite lateral portions being bifurcated to provide branch portions, said branch portions being connected to said lateral walls; and a branch angle α at which said branch portions diverge from said mass section is set within a range of about 30° to about 60° and a ratio T/L of their thickness to length is set within a range of about 0.2 to about 0.5.

5. An exhaust pipe supporting device as set forth in claim 1 or 4, wherein a thickness of said mass section ranges from about 0.7 to about 5.0 times a thickness of said body portion.

6. An exhaust pipe supporting device as set forth in claim 4, wherein said metal mass portion is inseparably attached to the elastic material of said central connector portion by one of adhesive and embedding means.

7. An exhaust pipe supporting device as set forth in claim 4 wherein said mass section is greater in thickness than said branch portions.

8. An exhaust pipe supporting device as set forth in claim 4 wherein said mass section extends in a direction of a thickness of said body portion beyond a remainder of said body portion.

* * * * *